(12) United States Patent
Yoon

(10) Patent No.: US 7,758,430 B2
(45) Date of Patent: Jul. 20, 2010

(54) STRUCTURE FOR TRIPOD CONSTANT VELOCITY JOINT AND METHOD OF ASSEMBLING ROLLER ASSEMBLY

(75) Inventor: Dong Young Yoon, Chungbuk Cheongju (KR)

(73) Assignee: Korea Flange Co., Ltd., Ulsan (KR)

( * ) Notice: Subject to any disclaimer, the term of this patent is extended or adjusted under 35 U.S.C. 154(b) by 487 days.

(21) Appl. No.: 11/604,307

(22) Filed: Nov. 27, 2006

(65) Prior Publication Data

US 2007/0149296 A1     Jun. 28, 2007

(30) Foreign Application Priority Data

Dec. 27, 2005    (KR)  ...................... 10-2005-0130166

(51) Int. Cl.
*F16D 3/205*    (2006.01)
(52) U.S. Cl. ....................................... 464/111; 464/905
(58) Field of Classification Search ................. 464/111, 464/905
See application file for complete search history.

(56) References Cited

U.S. PATENT DOCUMENTS

| | | | | |
|---|---|---|---|---|
| 5,362,275 A | * | 11/1994 | Girguis | ........................ 464/111 |
| 6,478,682 B1 | * | 11/2002 | Kura et al. | ................... 464/111 |
| 6,699,134 B2 | * | 3/2004 | Sams et al. | .................. 464/111 |
| 7,357,723 B2 | * | 4/2008 | Ishijima et al. | ............. 464/111 |
| 2004/0157667 A1 | * | 8/2004 | Ishijima et al. | ............. 464/111 |
| 2006/0205521 A1 | * | 9/2006 | Yoon | .......................... 464/111 |

* cited by examiner

*Primary Examiner*—Greg Binda
(74) *Attorney, Agent, or Firm*—MH2 Technology Law Group LLP

(57) ABSTRACT

A structure for a tripod constant velocity joint and a method of assembling a roller assembly maintains the structural stability of the tripod constant velocity joint, and minimizes the frictional force between a trunnion and a track, thus remarkably reducing the generation of axial force, therefore ensuring the stable operation and durability of the constant velocity joint. The structure for the tripod constant velocity joint includes an inner roller and an outer roller provided between a track of a housing and a trunnion of a spider. A roller groove is formed on a central portion of an outer surface of the outer roller in a circumferential direction of the outer roller. Further, a plurality of recesses is formed on a surface of the trunnion to reduce a contact area with the inner roller.

8 Claims, 12 Drawing Sheets

STRUCTURE FOR TRIPOD CONSTANT VELOCITY JOINT AND METHOD OF ASSEMBLING ROLLER ASSEMBLY

BACKGROUND OF THE INVENTION

1. Field of the Invention

The present invention relates generally to a structure for a tripod constant velocity joint and a method of assembling a roller assembly and, more particularly, to a structure for a tripod constant velocity joint and a method of assembling a roller assembly, which maintain the structural stability of the tripod constant velocity joint, and minimize the frictional force between a trunnion and a track, thus remarkably reducing the generation of axial force, therefore ensuring the stable operation and durability of the constant velocity joint.

2. Description of the Related Art

Generally, a tripod constant joint is constructed to transmit power, using a housing, which is integrally coupled to a stub shaft, and a spider, which is inserted into the housing and spline-coupled to a half shaft. Three trunnions are provided on the spider. Each of the trunnions is provided with rollers and bearings so as to absorb relative motion which occurs between the trunnion and the track of the housing. When the stub shaft and the half shaft of the tripod constant velocity joint are bent, relative motion occurs between the trunnions, the rollers, the bearings, and the track. The frictional force generated by the relative motion generates an axial force in the axial direction of the half shaft. The axial force attains its maximum value three times during one rotation of the tripod constant velocity joint.

Such an axial force is further increased when the load acting on the constant velocity joint is large, as in the sudden acceleration of a vehicle, or when a joint angle is large. Further, the axial force is problematic in that it causes horizontal vibration of the vehicle.

SUMMARY OF THE INVENTION

Accordingly, the present invention has been made keeping in mind the above problem occurring in the prior art, and an object of the present invention is to provide a structure for a tripod constant velocity joint and a method of assembling a roller assembly, which maintain the structural stability of the tripod constant velocity joint, and minimize the frictional force between an outer roller and a track and the frictional force between a trunnion and an inner roller, using a roller groove formed on the outer roller and a plurality of recesses formed on the trunnion, thus remarkably reducing the generation of an axial force, therefore securing the stable operation and durability of the constant velocity joint.

In order to accomplish the above object, the present invention provides a structure for a tripod constant velocity joint, including an inner roller and an outer roller provided between a track of a housing and a trunnion of a spider, a roller groove formed on a central portion of an outer surface of the outer roller in a circumferential direction of the outer roller, and a plurality of recesses formed on a surface of the trunnion to reduce a contact area with the inner roller.

BRIEF DESCRIPTION OF THE DRAWINGS

The above and other objects, features and advantages of the present invention will be more clearly understood from the following detailed description taken in conjunction with the accompanying drawings, in which:

FIG. 5b is a sectional view taken along line Z-Z of FIG. 5a;

FIG. 5d is a sectional view taken along line V-V of FIG. 5a;

DESCRIPTION OF THE PREFERRED EMBODIMENTS

Hereinafter, the preferred embodiment of the present invention will be described in detail with reference to the accompanying drawings.

Figure 1:
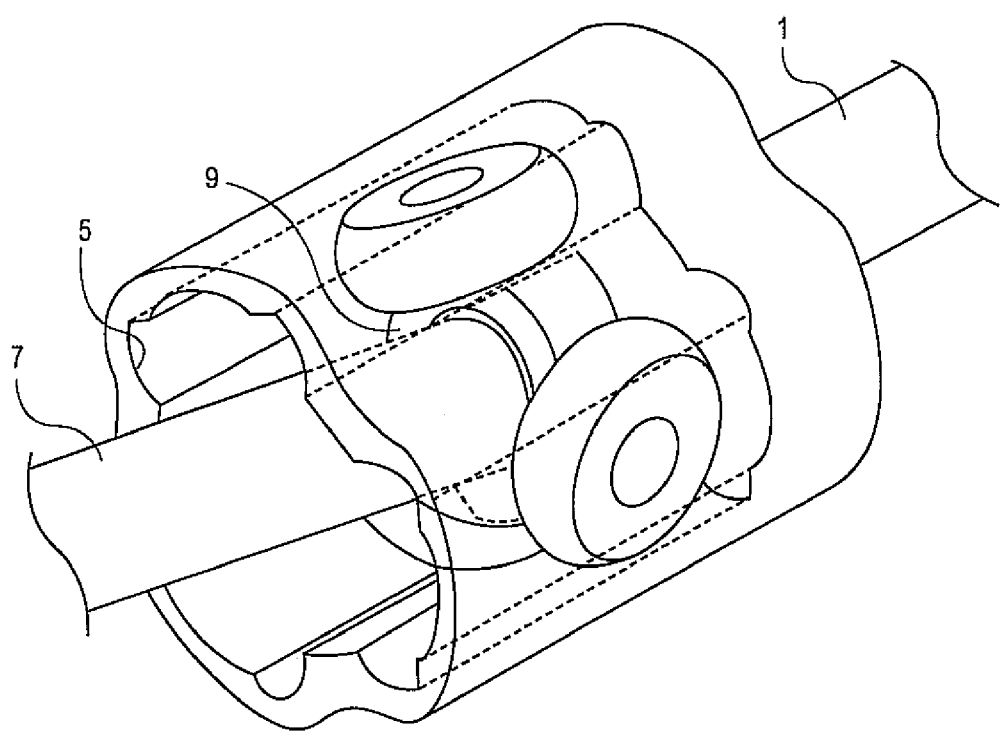
FIG. 1 is a perspective view showing a structure for a tripod constant velocity joint, according to the present invention.
Figure 2:
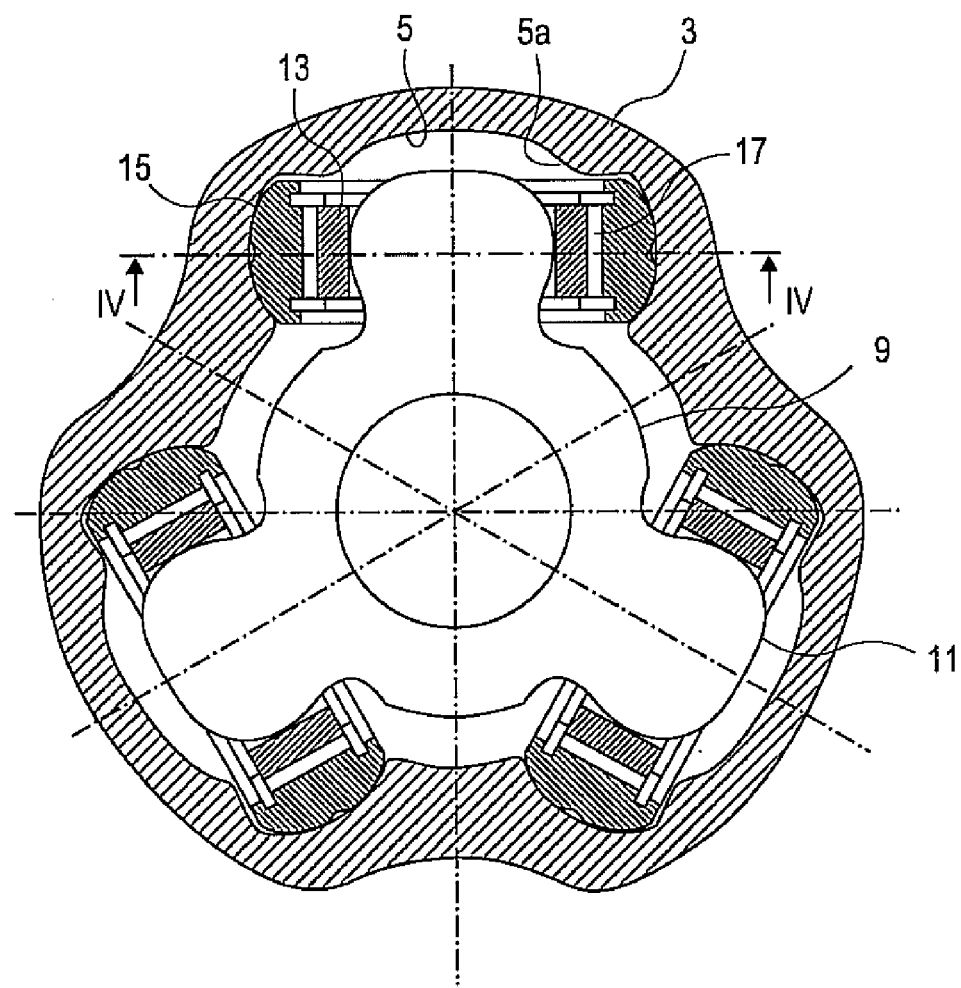
FIG. 2 is a sectional view showing a housing and a spider of FIG. 1, in an assembled state.
Figures 3A, 3B:
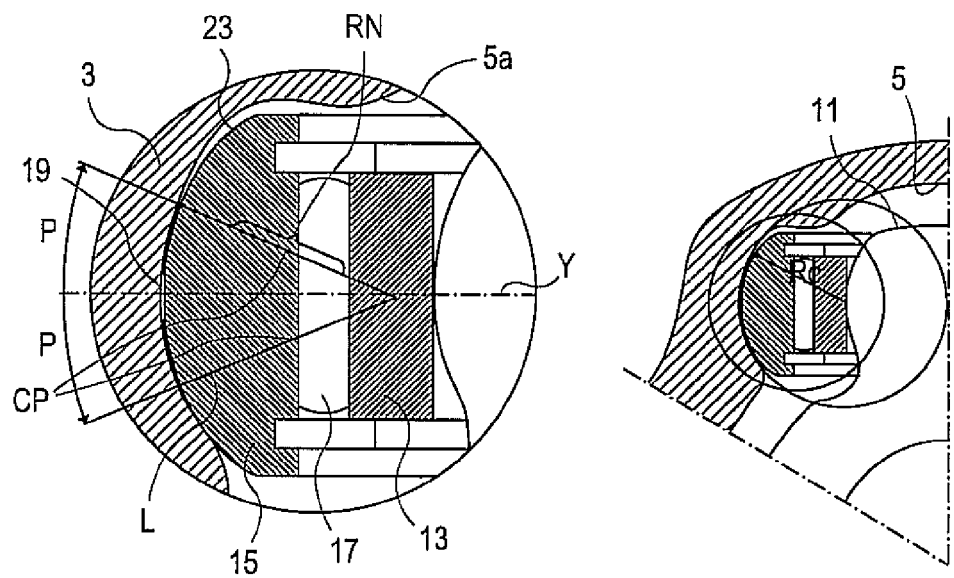
FIGS. 3A and 3B are an enlarged view showing a part of FIG. 2.
Figure 3C:
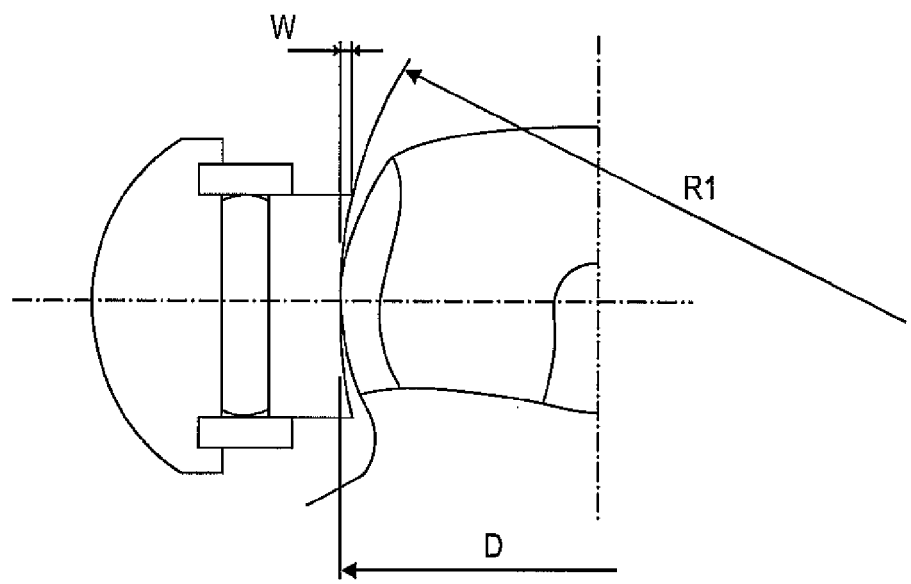
FIG. 3C is an alternative to the view of FIG. 3A-B and illustrating a curved inner roller.
Figure 4:
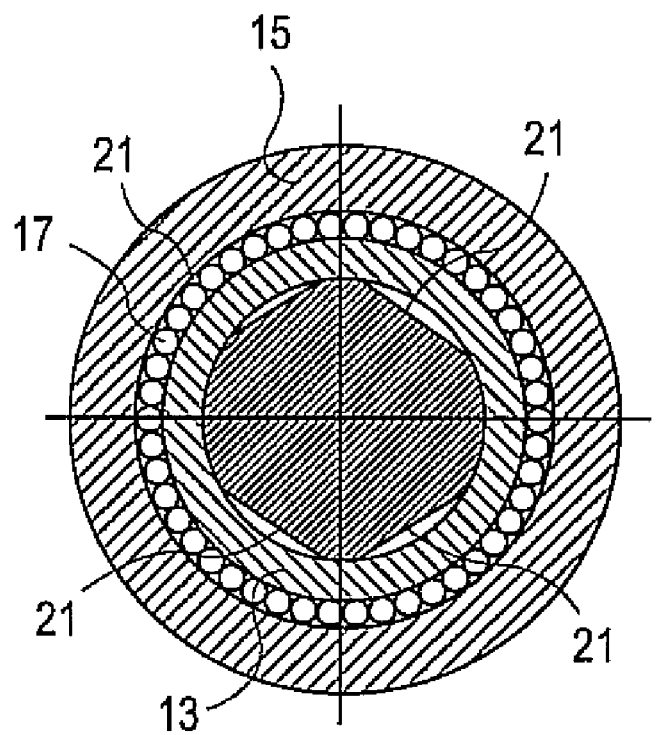
FIG. 4 is a sectional view taken along line IV-IV of FIG. 2.
Figure 5A:
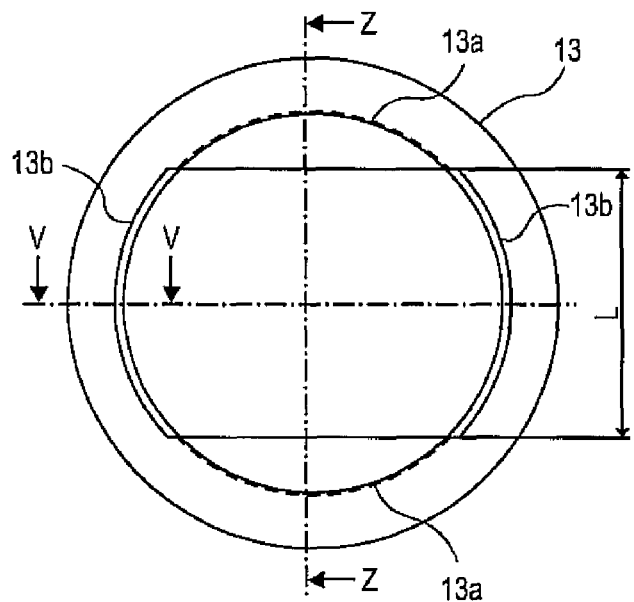
FIG. 5a is a plan view showing an inner roller, according to the present invention.
Figure 5B:
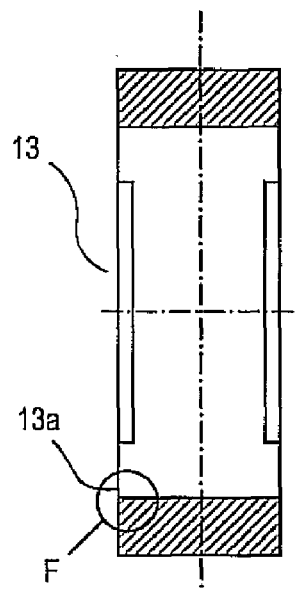
Figure 5C:
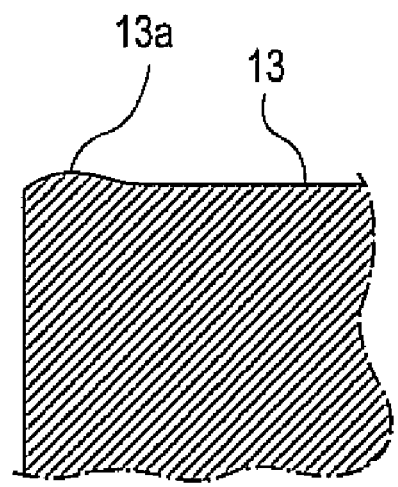
FIG. 5c is an enlarged sectional view showing portion F of FIG. 5b.
Figure 5D:
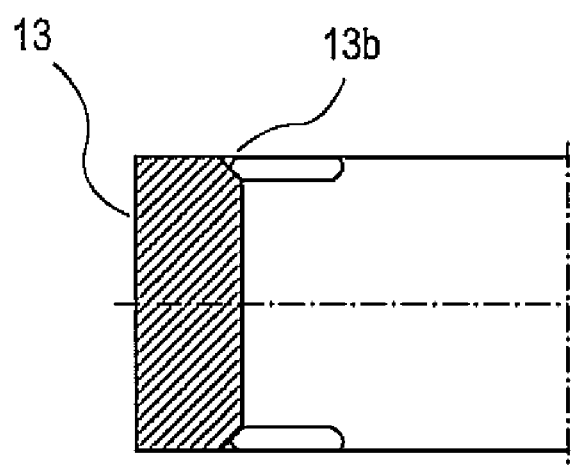
Figure 6A:
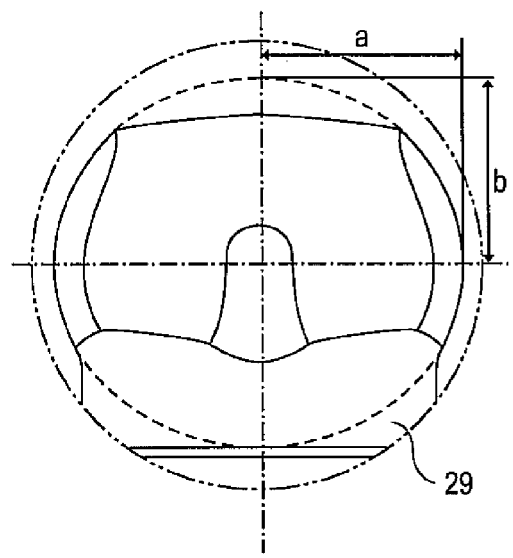
FIGS. 6A and 6B are views showing a structure of a trunnion, according to the present invention.
Figure 6B:
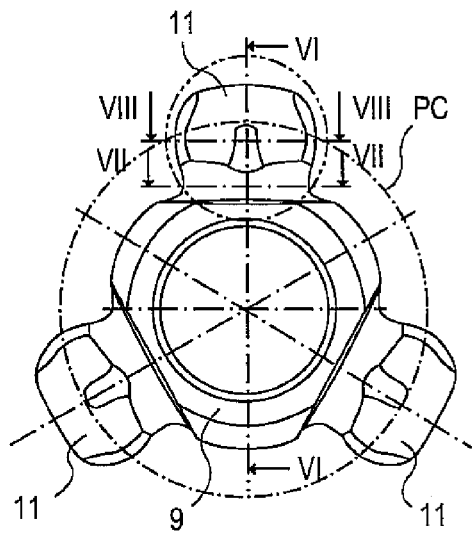
Figure 7:
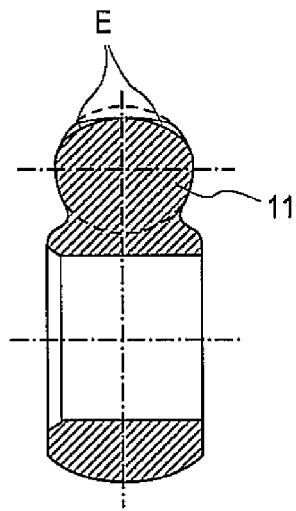
FIG. 7 is a sectional view taken along line VI-VI of FIG. 6A.
Figure 8:
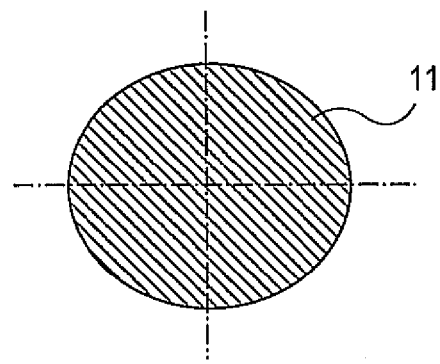
FIG. 8 is a sectional view taken along line VII-VII of FIG. 6A.
Figure 9:
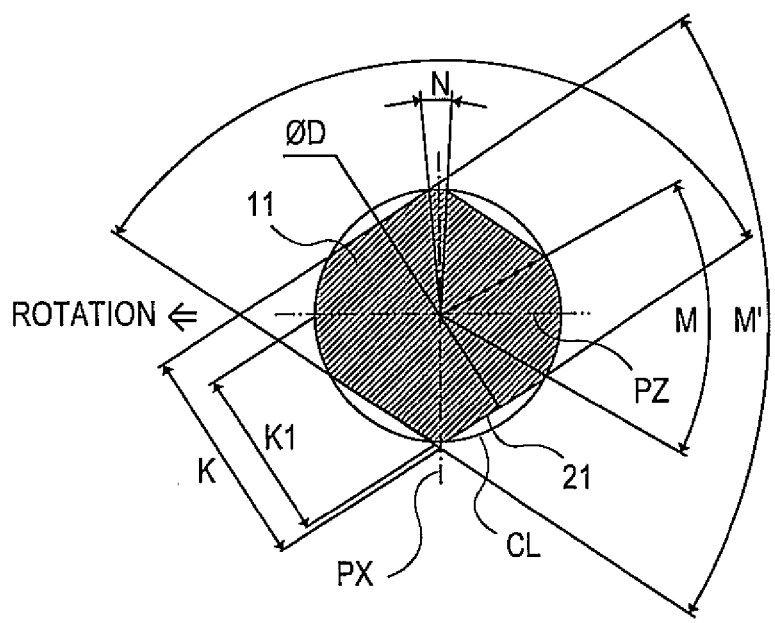
FIG. 9 is a sectional view taken along line VIII-VIII of FIG. 6A.
Figure 10:
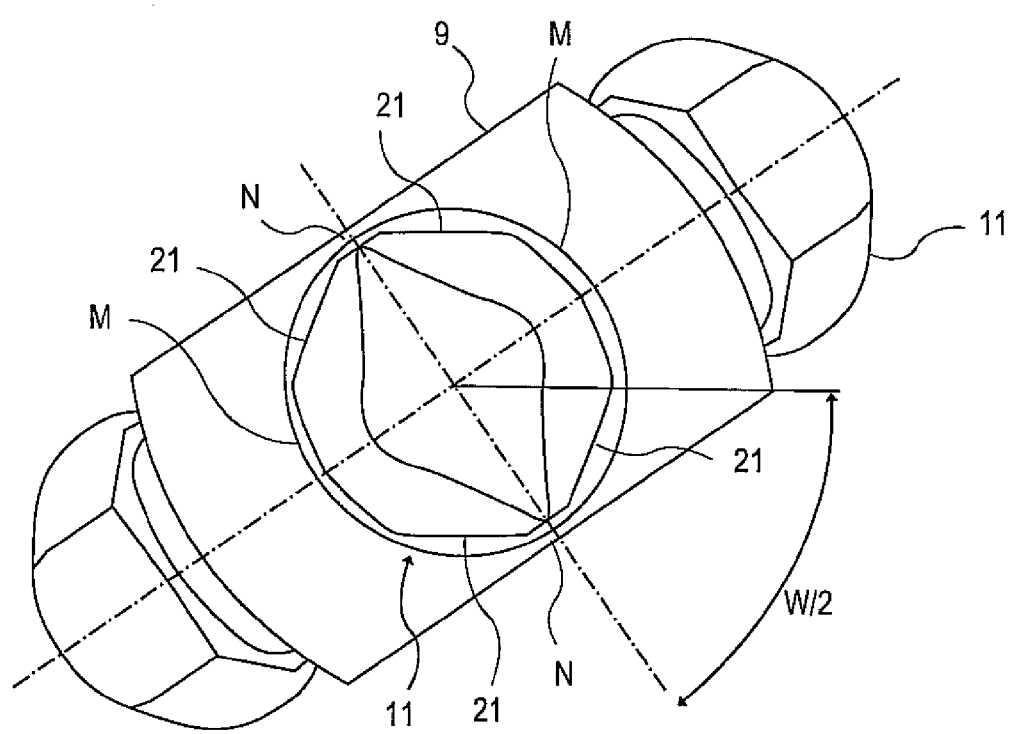
FIG. 10 is a side view showing the spider of FIG. 1.

FIG. 1 is a perspective view showing a structure for a tripod constant velocity joint, according to the present invention, FIG. 2 is a sectional view showing a housing and a spider of FIG. 1, in an assembled state, FIG. 3 is an enlarged view showing a part of FIG. 2, FIG. 4 is a sectional view taken along line IV-IV of FIG. 2, FIG. 5a is a plan view showing an inner roller, according to the present invention, FIG. 5b is a sectional view taken along line Z-Z of FIG. 5a, FIG. 5c is an enlarged sectional view showing portion F of FIG. 5b, FIG. 5d is a sectional view taken along line V-V of FIG. 5a, FIG. 6B is a view showing a structure of a trunnion, according to the present invention, FIG. 7 is a sectional view taken along line VI-VI of FIG. 6B, FIG. 8 is a sectional view taken along line VII-VII of FIG. 6B, FIG. 9 is a sectional view taken along line VIII-VIII of FIG. 6B, and FIG. 10 is a side view showing the spider of FIG. 1.

The present invention relates to a structure for a tripod constant velocity joint which transmits power at constant velocity, regardless of the joint angle between shafts.

According to the present invention, a roller groove 19 is formed on the central portion of the outer surface of an outer roller 15 in a circumferential direction, and a plurality of recesses 21 is formed on the surface of a trunnion 11. Thereby, when a joint angle is formed between shafts, the roller groove 19 and the recesses 21 function to reduce frictional force, which is generated by the relative motion between a track 5, rollers 13 and 15, and the trunnion 11.

As shown in FIGS. 1 to 10, the tripod constant velocity joint, according to the present invention, includes an inner roller 13 and an outer roller 15 located between the track 5 of a housing 3, coupled to a stub shaft 1, and the trunnion 11 of a spider 9, provided on an end of a half shaft 7, and needle bearings 17 provided between the inner roller 13 and the outer roller 15.

As shown in FIG. 3, the roller groove 19 of the outer roller 15 is defined by the junction of two arc parts 23, provided on opposite sides of a division line Y, which divides the outer roller 15 into two parts in a section perpendicular to the rotating central axis X of the outer roller 15. The radial center CP of each arc part 23 is located within a range RN from ¼ to ¾ of a line segment L, which connects a contact point between the arc part 23 and the track 5 to the division line Y while extending vertically from the contact point.

Further, the radial centers of the two arc parts 23 are positioned to be symmetrical with respect to the division line Y. Thereby, the two arc parts 23 are formed to be symmetrical with respect to the division line Y.

Thus, the two line segments L, connecting the contact points between the arc parts 23 and the track 5 to the division line Y, meet at the division line Y. This means that the rotation radius $R_O$ of the track 5 of the housing 3 is constant at the position where the track 5 contacts the outer roller 15, and the central point of the rotation radius $R_O$ is the intersection point between the two line segments L and the division line Y.

The front sectional view and the upper sectional view of journal (trunnion) are oval-shaped (egg-shaped). At this time the datum point is the centroid of the journal. If the longest radius of these Front sectional view and the upper sectional view is R, then the progressively shorter radius are r1, r2, r3, that is R>r1, r2, r3. As a result the area of contact becomes smaller. Therefore thrust resistance of shaft is reduced.

The inner roller 13 contacting the trunnion can be one of at least two shapes. In one example, the inner roller 13 has a constant radius thereacross as shown in FIG. 3A-3B. In another example illustrated in FIG. 3C, the inner roller 13 can include a curved shape defined by a varying radius.

In this case, a rotation radius R1 of each arc part 23 is smaller than the rotation radius $R_O$ of the track 5. Reference character P denotes the contact angle between the inner circumferential surface of the track 5 and each arc part 23 formed on the outer circumferential surface of the outer roller 15.

Actually, the roller groove 19 is formed on the outer circumferential surface of the outer roller 15 by rotating the section of the outer roller 15 that defines the two arc parts 23 around the rotation central axis X.

One outer roller 15 is supported by the roller groove 19 at four positions where the outer roller 15 contacts the track 5 of the housing 3, so that it maintains a stable state. Oil is contained in the roller groove 19, thus smoothly conducting lubrication between the outer roller 15 and the track 5.

As such, the reduction in contact area between the track 5 of the housing 3 and the outer roller 15 and the improvement of lubricating performance by the oil contained in the roller groove 19 reduce the frictional force between the track 5 and the outer roller 15, thus reducing the axial force generated when the tripod constant velocity joint transmits power.

As shown in FIGS. 5a to 5d, a pair of locking steps 13a is provided on the lower end of the inner circumferential surface of the inner roller 13 in such a way as to form a predetermined angle in a circumferential direction and to face each other. A pair of chamfered parts 13b is provided between the locking steps 13a in such a way as to form a predetermined angle in the circumferential direction and to face each other.

The track 5 of the housing 3 is formed as one circle, unlike the roller groove 19 which is formed as two circles meeting at a predetermined position. Thus, it has excellent formability in a forging operation and is easy to measure. Even if a large amount of torque is applied under the operating angle of the joint, a roller assembly is not inclined due to inclination preventing steps 5a formed on the outer portion (as seen in a radius direction) of the track 5. Thereby, the roller assembly stably rolls on the division line Y, thus considerably contributing to reduction of the axial force of the joint.

As shown in FIG. 6B, the trunnion 11 contacting the inner roller 13 has the shape of an ellipse. In this case, a major axis a and a minor axis b of the ellipse have a predetermined ratio.

As shown in FIGS. 8 and 9, each of the recesses 21 of the trunnion 11 is formed between a wide angle part M and a narrow angle part N. The wide angle part M is formed along the rotating direction of the trunnion 11 on the section contacting a pitch circle PC of the trunnion 11. The narrow angle part N is formed in a direction perpendicular to the rotating direction of the trunnion 11 to be narrower than the wide angle part M.

The wide angle part M and the narrow angle part N are formed at the same rotation radius from the central axis of the trunnions 11.

In a detailed description, in a circle CL having as a center thereof the central axis of the trunnion 11 and forming the outer edges of the wide angle part M and the narrow angle part N, the part between the wide angle part M and the narrow angle part N is recessed into the circle CL, thus forming the recess 21.

Wide angle parts M are provided on both sides of the rotating surface PZ of the trunnion 11 in such a way as to form a predetermined angle and have the same rotation radius. Meanwhile, narrow angle parts N are provided on both sides of a surface PX, which is perpendicular to the rotating surface PZ of the trunnion 11, in such a way as to form a predetermined angle and have the same rotation radius.

In this case, the angle of each wide angle part M is greater than that of each narrow angle part N. Reference character M' denotes the angle between two recesses 21 which are formed on opposite sides of the rotating surface PZ of the trunnion 11. When the angular ratio M'/M is 0.80 or less, the width of the wide angle part M is increased, so the width of the recess 21 is reduced. Thus, due to the interference with the locking steps 13a during assembly, the assembleability is poor. Conversely, when the angular ratio is 1.08 or higher, the wide angle part M is excessively narrow, so that contact stress is increased. Therefore, it is preferable that the angular ratio be from 0.8 to 1.08.

As shown in FIG. 7, a portion E, shown by oblique lines, of the trunnion 11 which is formed by rotating about the X-X axis is removed, so that the trunnion 11 is rounded. Such a shape increases the lifespan of a metal mold used in a forging operation, in addition to enhancing productivity. Further, it allows the roller assembly to be easily assembled, and stabilizes the roller assembly when the joint is bent at a large angle, thus contributing to preventing NVH (Noise, Vibration, Harshness).

Of course, the forming range of each recess 21 is determined by the wide angle part M and the narrow angle part N.

The trunnion 11 comes into contact with the inner roller 13 only at the wide angle parts M and the narrow angle parts N, and the recesses 21 define space between the trunnion 11 and the inner roller 13 to store oil required for lubrication.

Thus, a contact area between the trunnion 11 and the inner roller 13 is considerably reduced, and the lubricating performance between the trunnion 11 and the inner roller 13 is fully ensured. As a result, during the power transmission of the tripod constant velocity joint, the frictional force between the trunnion 11 and the inner roller 13 is remarkably reduced, thus efficiently preventing axial force from being generated.

Most load, acting when the tripod constant velocity joint transmits power, is supported at the side of the wide angle parts M of the trunnion 11. The narrow angle parts N serve to maintain stable coupling between the inner roller 13 and the trunnion 11, which may become weak because of the recesses 21.

That is, in order to reduce the contact area between the inner roller 13 and the trunnion 11 using the recesses 21 and secure a stable coupling between the inner roller 13 and the trunnion 11, the narrow angle parts N are formed.

Meanwhile, as shown in FIG. 6B, a neck part 29 of the trunnion 11 has a section having the shape of an ellipse whose major axis is formed in the rotating direction of the trunnion 11.

Assuming that the same rotating force is transmitted, the neck part 29 having the elliptical section is lighter than a neck part having a circular section.

The method of assembling the roller assembly constructed as described above will be described below.

Figure 11A:
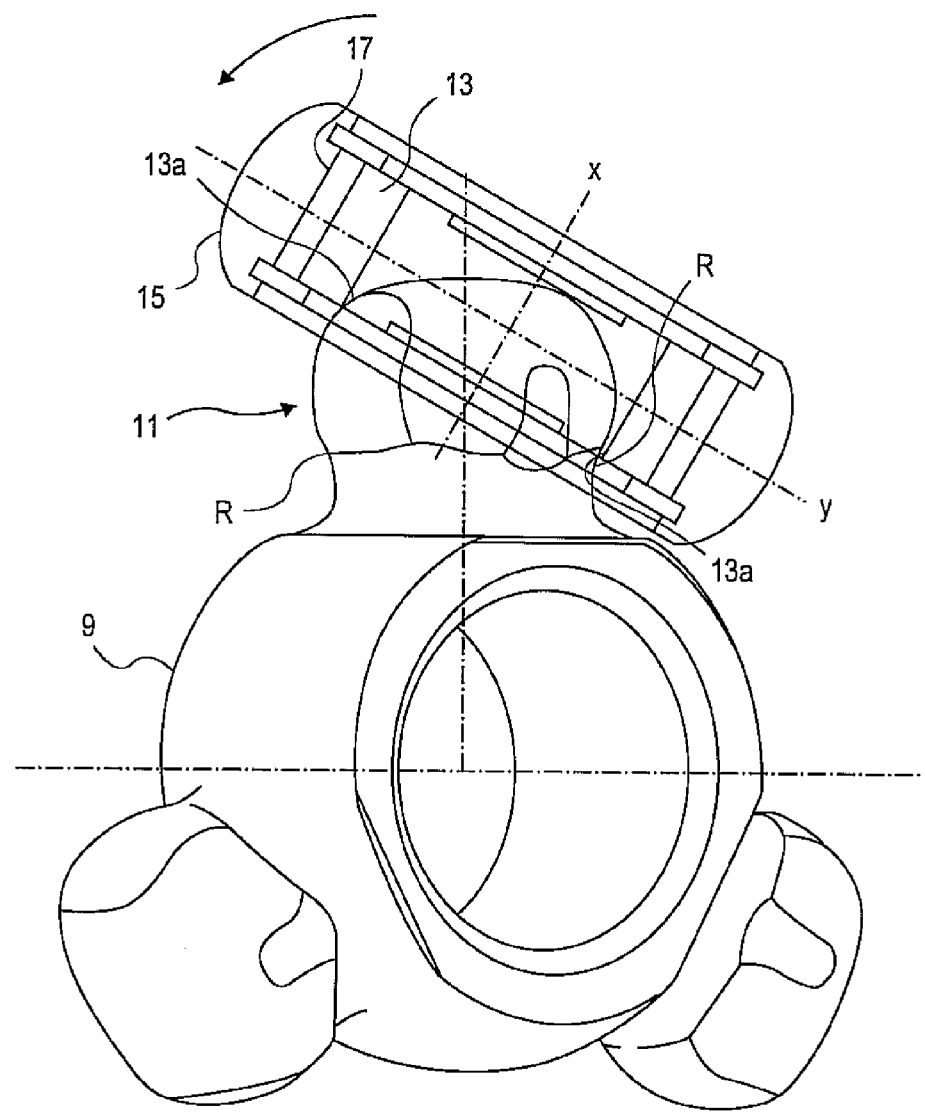
FIGS. 11a to 11c are views showing the method of assembling a roller assembly, according to the present invention.
Figure 11B:
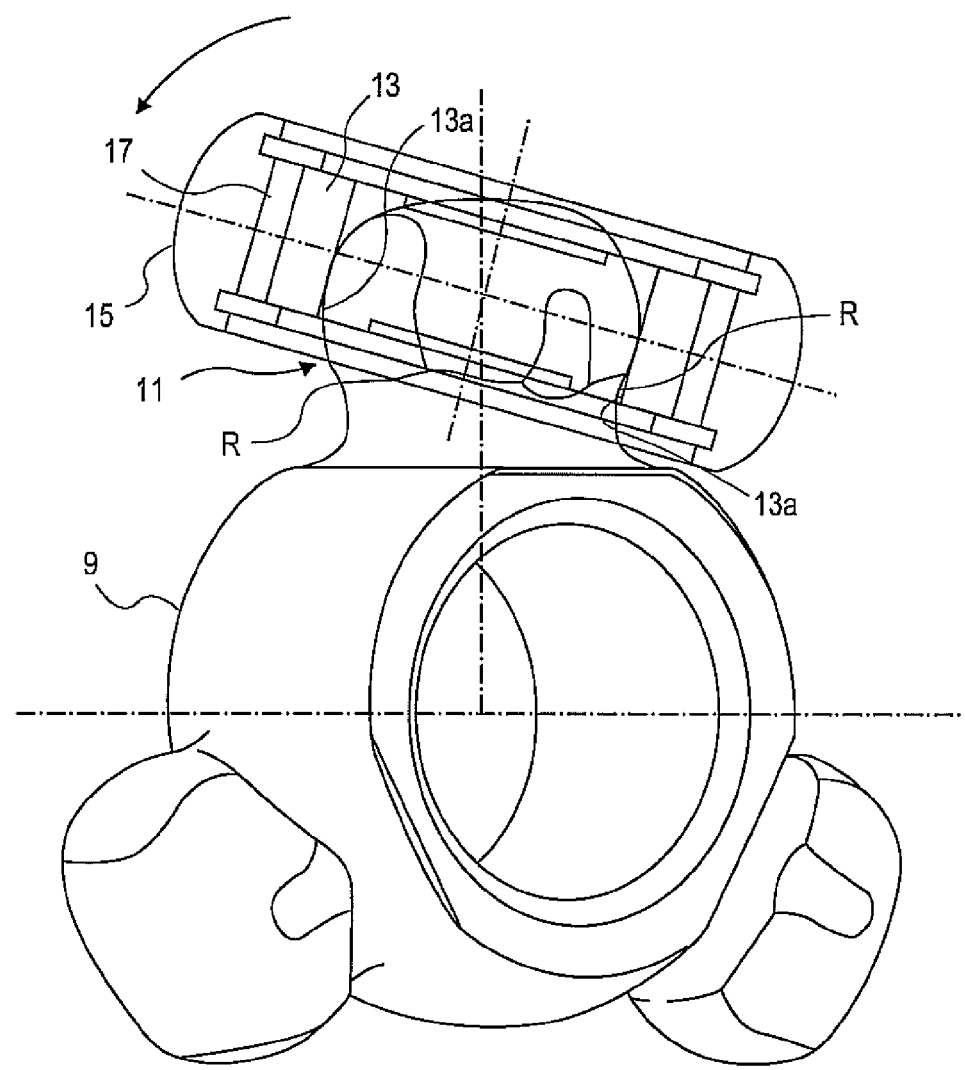
Figure 11C:
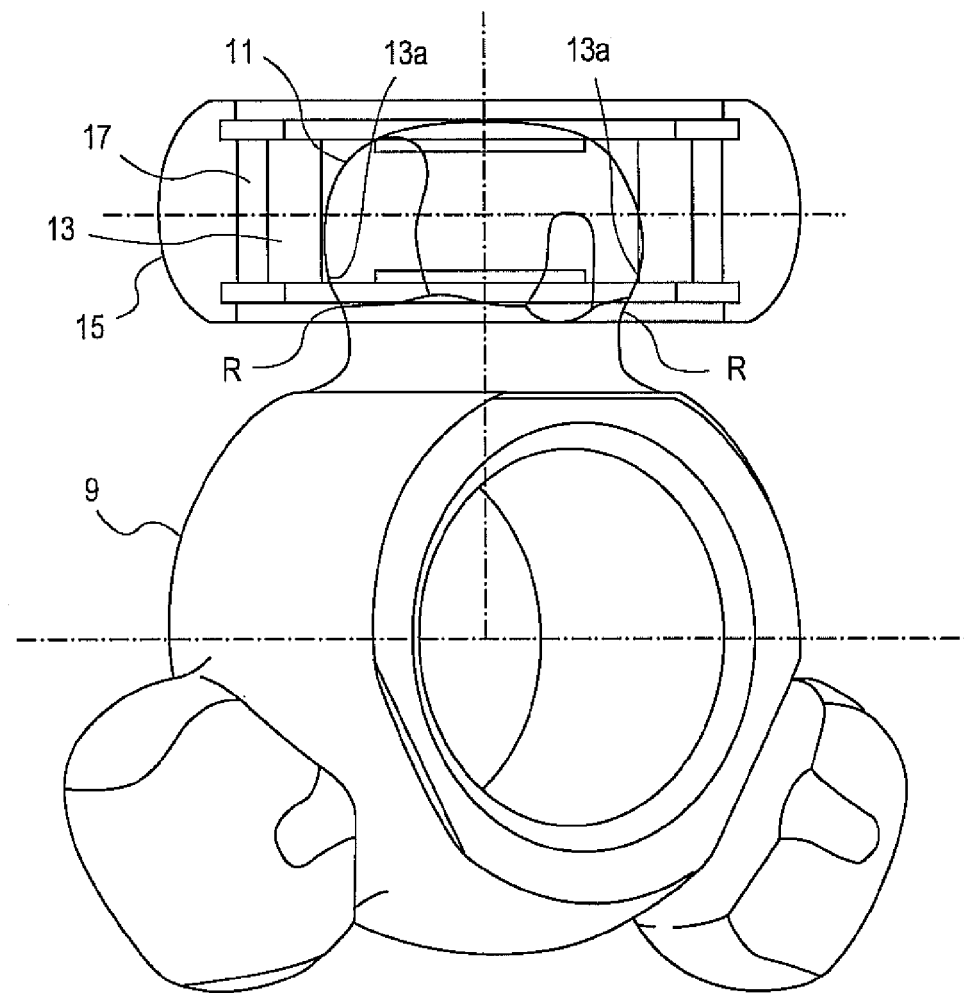

FIGS. 11a to 11c show the method of assembling the roller assembly, according to the present invention.

1) The roller assembly is inclined at a predetermined angle at the front surface of the trunnion 11. In such a state, the locking steps 13a provided on the lower end of the inner roller 13 come into contact with a portion R where the upper end of the neck part 29 of the trunnion 11 meets the spherical surface of the inner roller 13 (see, FIG. 11a).

In this case, the assembly condition is as follows. That is, W/2 is larger than the maximum joint angle.

An inner diameter of the inner roller 13 is larger than the inner diameter between the locking steps 13a formed on the inner circumferential surface of the inner roller 13. In FIG. 9, K1 denotes a line segment of a quarter circle defined by the rotating surface PZ of the trunnion 11 and the surface PX perpendicular to the rotating surface, and K denotes a distance between facing recesses 21.

2) In FIG. 11a, the roller assembly is fitted while rotating around a point where one of the locking steps 13a provided on the lower end of the inner roller 13 meets the portion R of the trunnion 11. If the locking step 13a provided on the opposite side of the lower end of the inner roller 13 is stopped by the spherical surface of the trunnion 11, the roller assembly is force-fitted with a slight force (see, FIG. 11b).

While the rotation center during assembly, that is, the point where the spherical surface of the trunnion 11 meets the inner circumferential surface of the inner roller 13 is moved, the roller assembly is assembled.

3) Once the roller assembly has been assembled, the roller assembly does not become disassembled as long as no force is intentionally applied to the roller assembly under the same condition as when assembling. Thus, when the assembly of the joint is executed in the production line, it is easy for a worker to maintain, in addition to providing excellent workability (see, FIG. 11c).

After the outer roller 15 of the roller assembly has been assembled, the maximum operation angle of the joint is 23 degrees, thus preventing the removal of the roller assembly and ensuring stability.

The structure for the tripod constant velocity joint according to the present invention remarkably reduces the frictional force between the outer roller 15 and the track 5 and the frictional force between the trunnion 11 and the inner roller 13, using the roller groove 19 and a plurality of recesses 21.

As described above, the present invention provides a structure for a tripod constant velocity joint and a method of assembling a roller assembly, which maintain the structural stability of the tripod constant velocity joint, and minimize the frictional force between an outer roller and a track and the frictional force between a trunnion and an inner roller, using a roller groove formed on the outer roller and a plurality of recesses formed on the trunnion, thus remarkably reducing the generation of an axial force, therefore securing the stable operation and durability of the constant velocity joint.

Further, oil is contained in the roller groove and the recesses, thus improving lubricating performance. The neck part of the trunnion has an elliptical cross-section, so that the weight can be relatively reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A structure for a tripod constant velocity joint, comprising:
    an inner roller and an outer roller provided between a track of a housing and a trunnion of a spider;
    a roller groove formed on a central portion of an outer surface of the outer roller in a circumferential direction of the outer roller; and
    at least four recesses formed on a surface of the trunnion to reduce a contact area with the inner roller wherein each of the recesses of the trunnion is formed between a wide angle part and a narrow angle part, the wide angle part being formed in a rotating direction of the trunnion on a section contacting a pitch circle of the trunnion, and the narrow angle part being formed in a direction perpendicular to the rotating direction of the trunnion and being narrower than the wide angle part, and the wide angle part and the narrow angle part are formed at the same rotation radius from a central axis of the trunnion.

2. The structure for the tripod constant velocity joint as set forth in claim 1, wherein a pair of locking steps is provided on a lower end of an inner circumferential surface of the inner roller in such a way as to form a predetermined angle in a circumferential direction and to face each other.

3. The structure for the tripod constant velocity joint as set forth in claim 1, wherein the roller groove of the outer roller is defined by a junction of two arc parts which are formed on opposite sides of a division line that divides the outer roller into two parts on a section perpendicular to a rotating central axis, and
    a radius center of each of the arc parts is located on a line segment connecting a contact point between the arc part and the track to the division line, the line segment perpendicular to the arc at the contact point.

4. The structure for the tripod constant velocity joint as set forth in claim 1, wherein a ratio between an angle of the wide angle part and an angle between two neighboring recesses positioned on opposite sides of the wide angle part is from 0.80 to 1.08.

5. The structure for the tripod constant velocity joint as set forth in claim 1, wherein the trunnion has a section having an ellipse shape.

6. The structure for the tripod constant velocity joint as set forth in claim 1, wherein a predetermined portion of the trunnion, formed by rotating about an axis perpendicular to the rotating central axis of the trunnion, is rounded.

7. The structure for the tripod constant velocity joint as set forth in claim 1, wherein the inner roller includes a constant radius.

8. The structure for the tripod constant velocity joint as set forth in claim 1, wherein the inner roller is defined by a varying radius.

* * * * *